United States Patent [19]
Holoubek et al.

[11] Patent Number: 5,203,379
[45] Date of Patent: Apr. 20, 1993

[54] HEADED THERMOPLASTIC TUBE

[75] Inventors: George H. Holoubek; John J. Rhoades, both of Muscatine, Iowa

[73] Assignee: Courtaulds Packaging Inc., Muscatine, Iowa

[21] Appl. No.: 744,247

[22] Filed: Aug. 13, 1991

Related U.S. Application Data

[62] Division of Ser. No. 581,460, Sep. 12, 1990, Pat. No. 5,069,856.

[51] Int. Cl.$^5$ .............................................. B65B 3/16
[52] U.S. Cl. ................................. 138/109; 138/118; 138/177; 222/107
[58] Field of Search ............. 138/103, 109, 177, 178, 138/118; 222/107, 94, 541

[56] References Cited

U.S. PATENT DOCUMENTS

| | | | |
|---|---|---|---|
| 2,313,031 | 3/1943 | Parkhurst | 222/107 |
| 2,396,635 | 3/1946 | Bogostowsky | 222/107 |
| 2,900,665 | 8/1959 | Walker | 18/19 |
| 2,945,266 | 7/1960 | Mainardi | 18/59 |
| 3,047,910 | 8/1962 | Downs | 18/59 |
| 3,178,065 | 4/1965 | Auerswald | 222/107 |
| 3,186,600 | 6/1965 | Guignard | 222/107 |
| 3,235,128 | 2/1966 | Hansen | 222/107 |
| 3,648,895 | 3/1972 | Strazdins | 222/107 |
| 3,823,850 | 7/1974 | Holoubek et a. | 222/107 |
| 3,984,268 | 10/1976 | Holoubek et al. | 156/69 |
| 3,993,223 | 11/1976 | Welker et al. | 222/107 |
| 4,100,953 | 7/1978 | Miller | 222/107 |
| 4,132,331 | 1/1979 | Mägerle | 222/107 |
| 4,185,757 | 1/1980 | Schultz | 222/107 |
| 4,219,525 | 8/1980 | Greenspan | 264/296 |
| 4,261,482 | 4/1981 | Yamada et al. | 222/107 |
| 4,362,255 | 12/1982 | Bond | 222/107 |
| 4,424,182 | 1/1984 | Cerny | 264/322 |
| 4,548,338 | 10/1985 | Sander | 222/107 |
| 4,551,371 | 11/1985 | Eckstein | 222/107 |
| 4,590,028 | 5/1986 | Rosenkrantz et al. | 264/154 |
| 4,659,408 | 4/1987 | Redding | 222/107 |
| 4,681,645 | 7/1987 | Fukushima et al. | 156/73.1 |
| 4,701,295 | 10/1987 | Kato et al. | 264/519 |
| 4,792,061 | 12/1988 | Nishido | 222/107 |
| 4,942,981 | 7/1990 | Schneider | 222/107 |
| 4,984,712 | 1/1991 | Jouillat | 222/107 |

FOREIGN PATENT DOCUMENTS

| | | | |
|---|---|---|---|
| 104629 | 8/1938 | Australia | 222/107 |
| 54-2815 | 6/1957 | Canada | 264/322 |
| 63-3913 | 1/1988 | Japan | 264/322 |

Primary Examiner—James E. Bryant, III
Attorney, Agent, or Firm—Armstrong, Westerman, Hattori, McLeland & Naughton

[57] ABSTRACT

A headed thermoplastic tube is formed solely from a thermoplastic extruded, stretched, cylinder by positioning the cylinder over a forming mandrel with an exposed portion. The inner surface of the exposed portion is heated above the glass transition temperature of the thermoplastic material to render the inner surface molten while the outer surface provides support for the exposed portion of the cylinder. The heated exposed portion is then shaped into a conical shape, such as by heating the outer surface, and pressure applied to the conical shaped exposed portion to form a headed thermoplastic tube. The headed tubes produced have a body portion, shoulder portion and neck portion, without any seams, all of which are formed from the starting thermoplastic extruded, stretched cylinder.

9 Claims, 3 Drawing Sheets

HEADED THERMOPLASTIC TUBE

This is a divisional of copending application Ser. No. 07/581,460 filed on Sep. 12, 1990 now U.S. Pat. No. 5,069,856.

FIELD OF THE INVENTION

The present invention relates to a method of forming headed thermoplastic tubes solely from an extruded thermoplastic sleeve without use of any additional thermoplastic material.

BACKGROUND OF THE INVENTION

Thermoplastic tubes that are formed as squeeze tubes are extensively used in packaging of cosmetics, toothpaste, shampoos, and the like. These tubes are formed as tubular members having an open end at a first end and a threaded or other closure-acceptable head at the second end, with a closure used to seal the second end of the tube while the contents of the tube are charged to the tube through the first end. After filling, the first end of the tube is closed, such as by heat sealing, to complete the filled tube for sale.

A problem has existed in formation of such tubes in that the closure-acceptable head is usually formed separately from the tubular member and provision of a complete seal between the head and tubular member must be assured.

One well known commercial method for producing such headed tubes is that disclosed in U.S. Pat. No. 3,047,910 to M. H. Downs. In this process, a tubular member is placed in a forming collar and a separate molten disc of thermoplastic material forced into an open end of the tubular member while retained by the forming collar. The latent heat of the molten disc welds the peripheral edge of the disc to the inner circumferential wall of the tubular member, and forms an end closure for the tubular member. Pressure is applied to the hot sealed end closure to shape the head into the desired shape and an orifice then formed through the end of the closure. The head is then fitted with a threaded cap or other closure to provide a closed end tube ready for filling with the desired contents for the tube.

In method such as that disclosed by the Downs' patent, some difficulties remain, such as controlling of the thickness and weight of the head and exact color matching of the tubular member and the head. The Downs' process also can not be used to commercially prepare tubes from polycarbonates and polyvinyl chloride material. Also, any time two separate units such as a tubular member and head are combined, a possible source of weakness exists at the juncture of the two. In addition, with such a juncture, a joint between the tubular member and head, a problem of providing a continuous barrier container is present where the tube is formed of a barrier material, such as from an oxygen-barrier containing composite thermoplastic material.

There have been attempts in the past to produce thermoplastic squeeze tubs by extruding a thermoplastic tubing, cutting the tubing into sleeves or tubular members, heating one end of the sleeve to a molten mass and forming it into a head to make the thermoplastic tube. These methods have not been successful because heat transfer is slow and the molten plastic difficult to control. In such attempts, a sufficient amount of molten thermoplastic cannot be accumulated on the end of the tube to form the desired head.

It is an object of the present invention to provide a method for forming a headed thermoplastic tube solely from a sleeve or tubular member.

It is another object of the present invention to provide a thermoplastic squeeze tube having a head portion that does not have any joint or juncture between the tubular portion of the tube and the head portion thereof.

SUMMARY OF THE INVENTION

A method of forming a headed thermoplastic tube from an thermoplastic extruded, stretched cylinder is provided by positioning the cylinder over a forming mandrel with an exposed portion of the cylinder extending beyond a head forming end of the mandrel. The inner wall surface of the exposed portion of the thermoplastic cylinder is heated to a temperature above the glass transition temperature of the thermoplastic material to render the inner surface area molten, such as by use of a blast or hot air directed against the inner wall surface, while maintaining the outer surface of the cylinder below the glass transition temperature so as to provide support for the exposed portion of the cylinder and retain the cylindrical shape thereof. The heated exposed portion is then shaped into a conical shape, such as by directing hot air against the outer surface thereof. Pressure is then applied to the conical shaped exposed portion of the thermoplastic extruded cylinder to form a headed thermoplastic tube. The pressure applied to the conical shaped exposed end portion is preferably by forcing the same into an abutting die by use of the head forming end on the mandrel.

The extruded thermoplastic cylinder may be formed from a single thermoplastic material or the cylinder may be formed from a laminate or composite of a plurality of layers of materials, one layer of which may be an oxygen-impermeable material.

The tubes of the present invention are formed solely from a thermoplastic extruded, stretched, cylinder and have a tube body, shoulder an neck, all of which are comprised of the thermoplastic material from which the cylinder was formed, the tubes having no seams or joints present throughout the tube.

BRIEF DESCRIPTION OF THE DRAWINGS

The present method will now be explained with reference to the accompanying drawings wherein like numerals indicate like parts throughout the drawings, and wherein.

DETAILED DESCRIPTION

Figure 1:
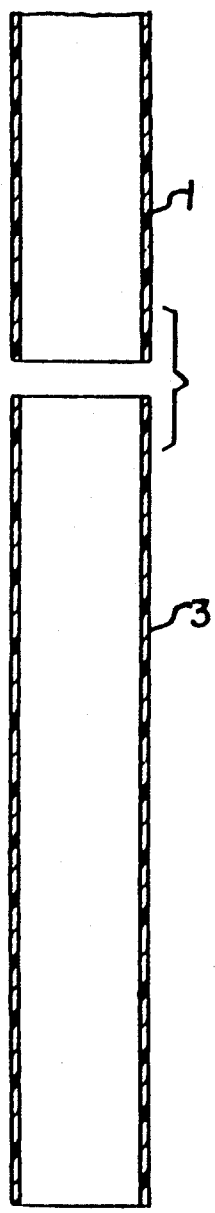
FIG. 1 illustrates, in cross-section, a thermoplastic extruded, stretched, cylinder from which the method of the present invention forms a headed thermoplastic tube.

The headed thermoplastic tubes produced according to the present method can be formed from various thermoplastic materials. Such thermoplastic materials include, but are not limited to, high density polyethylene, low density polyethylene, polypropylene, a polyester such as polyethylene terephthalate, polycarbonates, polyvinyl chloride, and the like.

The headed thermoplastic tubes may also be formed from multi layers or laminates of various plastic materials, such as a layer of an oxygen-impermeable material comprising a polyamide such as nylon, or ethylene polyvinyl alcohol, a polyvinylidene chloride or the like sandwiched between two polyethylene outer layers. Also, five layer composites, comprising outer layers of a thermoplastic such as polyethylene, polypropylene, a polyester such as polyethylene terephthalate, an inner layer of an oxygen-impermeable material, and adhesive layers between the oxygen-impermeable material and each outer layer of thermoplastic to bond the same, can be used to form thermoplastic headed tubes according to the present method.

The thermoplastic headed tubes are formed from a flexible material and are readily squeezable and collapsible to force the contents of the tube out of an orifice formed in the end of the tube at the head portion. They are generally of a size having a wall thickness of the cylinder portion of between about 0.010 to 0.040 inch in thickness, while a shoulder of the neck portion of the tube will be thicker than the wall of the cylinder, generally between 0.035 to 0.045 inch thick. Since the tube is formed from an extruded cylinder, the wall thickness of the cylindrical portion will be very uniform, with a variance in wall thickness of the cylindrical portion being only about + or − 10 percent.

The extruded cylinder from which the headed thermoplastic tube is formed is a cylinder cut from a tubular extrusion which has a wall thickness in the molten state preferably two to three times the wall thickness of the final cooled extruded thickness. Such a tubular extrusion, as is known, is formed by extruding thermoplastic material from an extrusion annulus in a molten state and stretching the hot tubular form, in the direction of the longitudinal axis, into a tube or cylinder having a wall thickness one-half ($\frac{1}{2}$), one-third ($\frac{1}{3}$), or less, than the extrusion annulus. Such a stretch oriented extruded cylinder, when heated above the glass transition temperature of the thermoplastic material, due to the plastic memory of the thermoplastic material, will increase in thickness to the thickness of the molten material exiting the extrusion annulus, and shrink in length, thus providing sufficient molten plastic mass to form a head on the cylinder according to the present method. When using high density polyethylene or low density polyethylene, for example, the annulus would extrude a tubular form of about 1.5 inch in diameter having a wall thickness between about 0.040–0.046 inch, which would be stretched into a stretched oriented extruded cylinder of about 1.0 inch in diameter having a wall thickness between about 0.015–0.018 inch.

Figure 2:
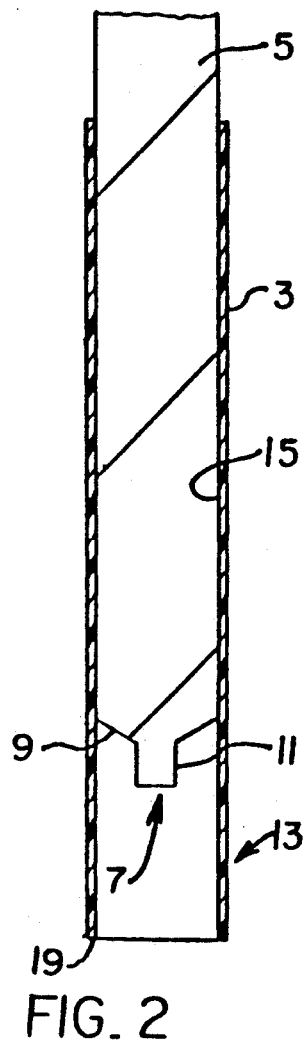
FIG. 2 illustrates the thermoplastic extruded, stretched, cylinder of FIG. 1 supported on a forming mandrel having a head forming end.

Referring now to the drawings, FIG. 1 shows a thermoplastic extruded, stretched extrusion 1 from which a thermoplastic extruded, stretched, cylinder 3 is cut. The thermoplastic extruded, stretched, cylinder 3 is disposed on a forming mandrel 5 that has a head forming end 7 formed of a shoulder 9 and a reduced diameter portion 11, with an exposed portion 13 of the thermoplastic extruded, stretched, cylinder 3 extending beyond the head forming end 7 of the forming mandrel 5 (FIG. 2). The thermoplastic extruded, stretched, cylinder 3 is frictionally held on the forming mandrel 5, with only a small clearance, such as about 0.005 inch clearance, which maintains the cylinder in place, while preventing subsequent flow of hot fluid between the forming mandrel 5 and the inner wall surface 15 of the thermoplastic extruded, stretched, cylinder 3.

Figure 3:
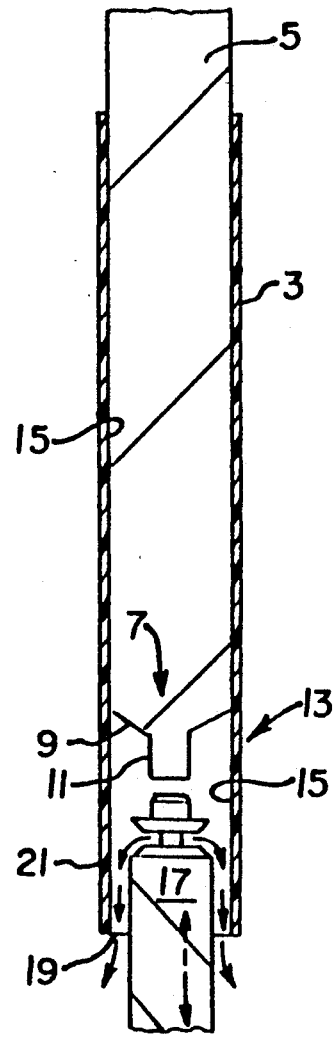
FIG. 3 illustrates heating of the exposed inner wall surface of the exposed portion of the thermoplastic extruded, stretched, cylinder by a hot fluid.

With the thermoplastic extruded, stretched, cylinder 3 disposed on the forming mandrel, the inner wall surface 15 of the exposed portion 13 is heated, such as by impingement thereon of a hot fluid illustrated by the arrows in FIG. 3, such as air, from a hot nozzle 17 which is sized so as to permit insertion thereof into the open end 19 of the exposed portion 13. The hot air is directed outwardly towards the inner wall surface and flows away from the head forming end 7 of the unheated forming mandrel 5. The hot air nozzle 17 and forming mandrel 5 are reciprocally associated so that the hot air nozzle 17 can be disposed in and removed from the exposed portion 13 of the thermoplastic extruded, stretched, cylinder. The hot air nozzle 7 is shown as reciprocally movable, indicated by the dashed arrow in FIG. 3, while alternately the same can be fixed and the forming mandrel can be reciprocally movable.

The hot fluid heats the inner wall surface 15 of the exposed portion 13 to a temperature above the glass transition temperature of the thermoplastic material and melts the inner wall surface, while the outer surface 21 of the exposed portion 13 provides sufficient support to maintain the exposed portion 13 as a substantially cylindrical shape. When sufficient heat has been applied to the inner wall surface 15 of the exposed portion 13 to melt the same, the hot air nozzle 17 is removed from the exposed portion and the heated exposed portion 13 is shaped into a conical or fluted cone shape 25, such as by the application of additional heat of further hot fluid, indicated by arrows in FIG. 4, such as hot air, from external hot air nozzles 23, which heats the outer surface 21 of the exposed portion 13 of the thermoplastic extruded, stretched, cylinder 3 to a temperature above the glass transition temperature of the thermoplastic material and melts the same and renders it in a moldable state. While heating of the outer surface 21 by a hot fluid may be used to form the conical shape, it is also possible to continue the heating of the inner wall surface 15 of the exposed portion 13 until the outer surface no longer maintains the substantially cylindrical shape, such that a conical shape results in the exposed portion. Because the thermoplastic extruded cylinder 3 is a stretched material, when the exposed portion 13 is heated above the glass transition temperature, the plastic memory responds and the exposed portion 13 swells to a thickness of or substantially the thickness of the tubular extrusion thickness, generally about two to three times the wall thickness of the thermoplastic extruded, stretched, cylinder. The hot exposed portion, when above the glass transition temperature in addition to swelling in wall thickness, shrinks in the direction of the axis of the cylinder and provides a mass of moldable thermoplastic material 27 for forming of a head.

After shaping of the heated exposed portion 13 of the thermoplastic extruded, stretched, cylinder 3 into the conical shape 25 of moldable thermoplastic material 27, pressure is applied through the head forming end 7 of the forming mandrel 5 to form a headed thermoplastic tube 29 which comprises a body portion 30, shoulder portion 31 and neck portion 33 having a closed end 35 to close the end of the cylinder 3. The forming is carried out by applying pressure to the conical shaped portion 13, and, as illustrated schematically in FIG. 5, by the application of pressure by use of the head forming end 7 of the forming mandrel 5 and an abutting die 37. As illustrated, the die 37 may have a shoulder forming portion 39, neck forming section 41, and a closed end forming section 43 which are retained in separable mold sections 45 and 47. While the forming mandrel 5 is illustrated as being reciprocable to form the conical shaped portion 13 on the forming mandrel 5 into the abutting die 37, the forming mandrel could be fixed and the abutting die 37 reciprocated to cause application of pressure and formation of the headed thermoplastic tube.

Figures 4, 5, 6:
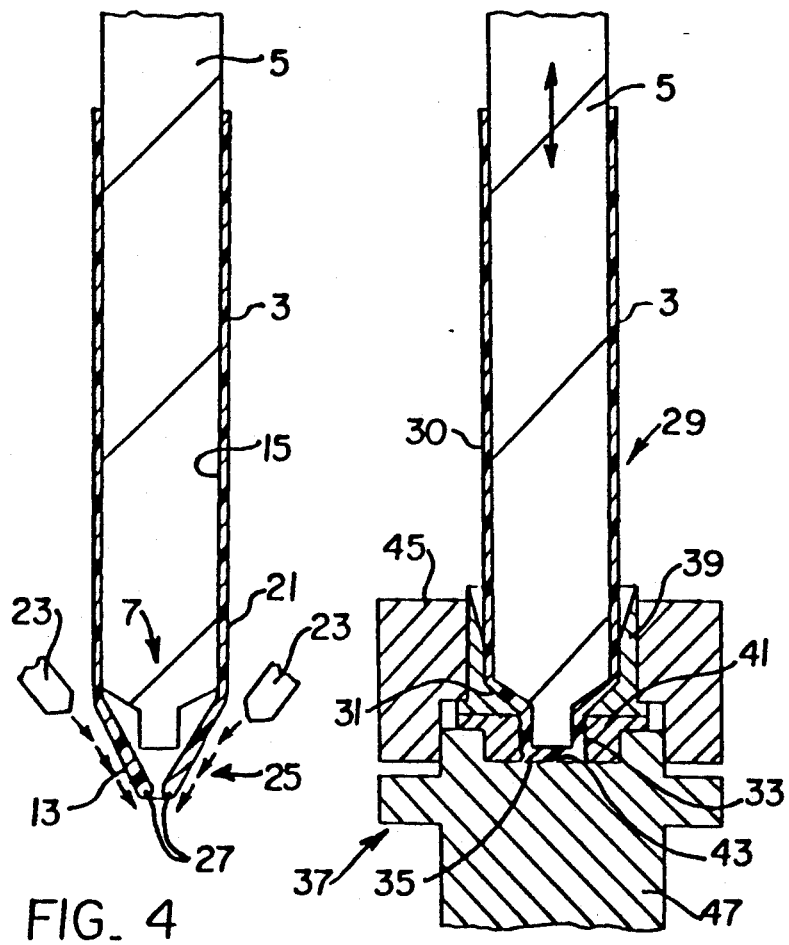
FIG. 4 illustrates the shaping of the heated exposed portion of the thermoplastic extruded cylinder into a conical shape.
FIG. 5 illustrates pressure being applied to the conical shaped exposed portion of the thermoplastic extruded cylinder into an abutting die to form a head.
FIG. 6 illustrates the finished headed thermoplastic tube on the forming mandrel prior to release therefrom.
Figure 7:
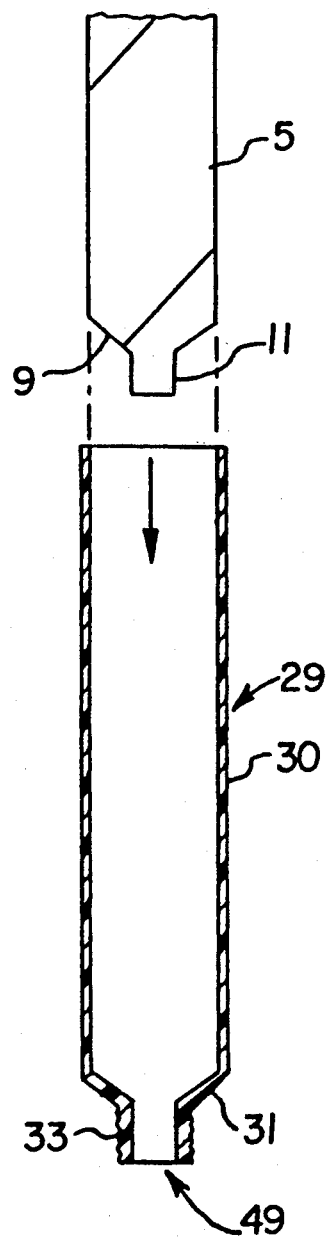
FIG. 7 illustrates the finished headed thermoplastic tube released from the forming mandrel.

FIG. 6 illustrated the formed headed thermoplastic tube 29 after removal of the head from the mold 37, still retained on the forming mandrel 5, while FIG. 7 shows the stripping or unloading of the finished headed thermoplastic tube 29 from forming mandrel 5 for finishing or use. As is conventional, the closed end 35 of the thermoplastic headed tube is subsequently punctured to form an orifice 49 therethrough.

Figure 8:
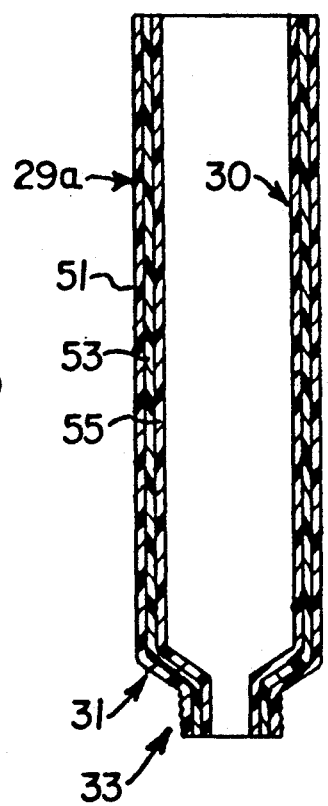
FIG. 8 illustrates a finished headed thermoplastic tube formed by the present method from a multilayer thermoplastic extruded, stretched, cylinder having three layers.
Figure 9:
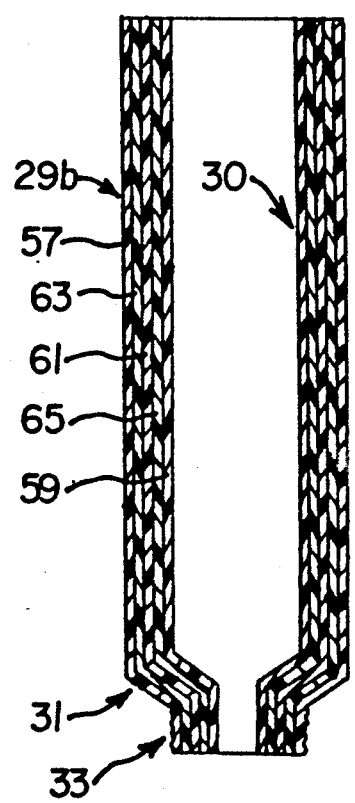
FIG. 9 illustrates a finished headed thermoplastic tube formed by the present method from a multilayer thermoplastic extruded, stretched, cylinder having five layers.

The thermoplastic headed tubes formed by the present method are tubes which have no seams or joints between the various portions. As shown in FIG. 7, the thermoplastic headed tube 29 has a body portion 30, shoulder portion 31 and neck portion 33, all of which are comprised of the thermoplastic material that the thermoplastic extruded, stretched, cylinder 3 was formed, and there are no seams or joints present throughout the entire tube. The thermoplastic headed tube, as hereinbefore described, may be formed from a single thermoplastic material or a laminate comprised of multilayers of thermoplastic materials, at least one of which may be an oxygen-impermeable material. FIG. 8, for example, illustrates a multilayer thermoplastic headed tube 29a a would be produced according to the present method having three layers, an outer layer 51, intermediate layer 53 and formed of a different thermoplastic material than the intermediate layer 53. For example, the outer and inner layers can comprise polyethylene while the intermediate layer would be an oxygen-impermeable layer, such as a polyamide such as nylon, or ethylene polyvinyl alcohol, a polyvinylidene chloride, or the like. FIG. 9 illustrates a multilayer thermoplastic headed tube 29b as would be prepared using the present method, having five layers, an outer layer 57, inner layer 59, intermediate impermeable layer 61, and two adhesive layers 63 and 65, one of the layers of adhesive provided between the intermediate layer 61 and each of the outer and inner layers 57 and 59. Such a tube could, for example, use polyethylene, polypropylene, or a polyester such as polyethylene terephthalate as the outer and inner layers, an oxygen-impermeable material such as nylon, ethylene polyvinyl alcohol, polyvinylidene chloride, as the intermediate layer, and adhesive layers to bond the outer and inner layers to the intermediate layer.

EXAMPLE

As an example of the present method, an extrusion of a thermoplastic material, a low density polyethylene, was made through an orifice size of 0.040 inch and stretched into a cylindrical form having a ⅜ inch inner diameter with a wall thickness of 0.015 inch. A thermoplastic extruded, stretched cylinder about 4⅛ inches long was cut from the cylindrical form and was fitted over a forming mandrel with an exposed portion of about ⅞ inch extending beyond a head forming end of the mandrel. The inner wall surface of the exposed portion was heated with hot air (about 1300° F.), above the glass transition temperature of the thermoplastic material while maintaining the outer surface thereof below said temperature. The heated exposed portion was then shaped into a conical shape by heating the outer surface of the heated exposed portion with hot air (1300° F.), and the conical shaped exposed portion pressed into an abutting die to form a neck and shoulder on the cylindrical body. The resultant low density polyethylene tube had a body portion having a 0.015 inch wall thickness and inner diameter of ⅜ inch, a neck portion of about ¼ inch in length and 5/16 inch in diameter, with a wall thickness of about 0.040 inch, and a shoulder portion of about ⅛ inch in length, having a wall thickness of about 0.040 inch. The resultant tube thus had a total length of about 4⅜ inches and had no seams or joints between the body portion, shoulder portion and neck portion.

The present method thus provides for the formation of a headed thermoplastic tube from an extruded plastic sleeve without the need for welding or fusing together of any separate components. The resultant headed tube has no seams, welds or joints. With thermoplastic laminates containing a barrier layer, the absence of such seams or joints is especially useful since there is a continuous barrier layer throughout the body portion, shoulder portion and neck portion. Complete control of the thickness and weight of the head portion of the tube an be achieved. Also, the color of the head portion and body portion will be exactly the same, and the decorative features of the body portion, such as stripes or windows can be carried through and incorporated in the head portion of the resultant tube.

What is claimed is:

1. A headed thermoplastic tube formed solely from a thermoplastic extruded, stretched, cylinder, said cylinder stretched in the direction of the longitudinal axis, said tube having a body portion, having a uniform wall thickness within a variance of only about 10 percent thickness, shoulder portion and neck portion, all of which are comprised of the thermoplastic material from which said thermoplastic extruded, stretched, cylinder was formed, with no seams or joints present throughout said body portion, shoulder portion and neck portion.

2. A headed thermoplastic tube as defined in claim 1 wherein said thermoplastic material is selected from the group comprising high density polyethylene, low density polyethylene, polypropylene, and polyethylene terephthalate.

3. A headed thermoplastic tube as defined in claim 1 wherein said thermoplastic material comprises a laminate of a plurality of layers of thermoplastic materials, one of said layers consisting of an oxygen-impermeable material.

4. A headed thermoplastic tube as defined in claim 3 wherein said oxygen-impermeable layer is selected from the group comprising nylon, ethylene polyvinyl alcohol and polyvinylidene chloride.

5. A headed thermoplastic tube as defined in claim 1 wherein said thermoplastic material comprises high density polyethylene.

6. A headed thermoplastic tube as defined in claim 1 wherein said thermoplastic material comprises low density polyethylene.

7. A headed thermoplastic tube as defined in claim 1 wherein the wall thickness of said body portions is between about 0.010 to 0.040 inch and the thickness of said shoulder portion and said neck portion are between about 0.035 to 0.045 inch.

8. A headed thermoplastic tube formed solely from a thermoplastic extruded, stretched, cylinder, said cylinder stretched in the direction of the longitudinal axis, said tube having a body portion, having a uniform wall thickness within a variance of only about 10 percent thickness, shoulder portion and neck portion, all of which are comprised of the thermoplastic material, selected from the group comprising high density polyethylene, low density polyethylene, polypropylene, and polyethylene terephthalate, from which said thermoplastic extruded, stretched, cylinder was formed, with no seams or joints present throughout said body portion, shoulder portion and neck portion.

9. A headed thermoplastic tube as defined in claim 8 wherein said thermoplastic material comprises a laminate of a plurality of layers of said thermoplastic material, and at least one layer of an oxygen-impermeable material selected from the group comprising nylon, ethylene polyvinyl alcohol and polyvinylidene chloride.

* * * * *